Patented Nov. 2, 1948

2,452,672

UNITED STATES PATENT OFFICE 2,452,672

MANUFACTURE OF UNSATURATED ORGANIC COMPOUNDS

Samuel Aaron Miller and Walter Henry Groombridge, Spondon, near Derby, England, assignors, by mesne assignments, to Celanese Corporation of America, a corporation of Delaware No Drawing. Application October 13, 1944, Serial No. 558,604. In Great Britain November 11, 1943

11 Claims. (Cl. 260—465.9)

This invention relates to the manufacture of unsaturated organic compounds.

A method of making unsaturated compounds, which is of very general application, consists in removing the elements of water from a saturated hydroxy compound, according to the equation:

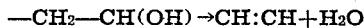

In a modification of this method the hydroxyl group is esterified, and the scission then gives rise to the acid corresponding to the esterifying group according to the equation:

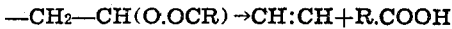

where R may be any suitable organic residue, and is usually methyl. Various classes of unsaturated compounds may be made by these methods, including olefinic hydrocarbons and unsaturated carboxylic acids and their esters and nitriles in which the double bond is in the alpha-beta position or is further from the carboxyl or nitrile group. Generally speaking these reactions may be caused to take place by subjecting the hydroxy compounds or their acyl esters to pyrolysis in the presence or absence of a catalyst.

One important reaction of this kind is the conversion of ethylene cyanhydrin or acetaldehyde cyanhydrin into acrylonitrile. When ethylene cyanhydrin or acetaldehyde cyanhydrin is subjected in the vapour phase to pyrolytic dehydration, a certain amount of acrylonitrile is sometimes produced, but the amount of acrylonitrile obtained is too small for the reaction to be considered as a useful means of making this compound. A more satisfactory reaction is the pyrolytic decomposition of ethylene cyanhydrin acetate or acetaldehyde cyanhydrin acetate into acrylonitrile and acetic acid. Although quite good yields of acrylonitrile can be obtained from these cyanhydrins in this way, the process suffers from the disadvantage of requiring two distinct operations: first the cyanhydrin must be acetylated, and then the acetate must be decomposed. Furthermore the process is expensive, in that if the acetylation is carried out by treating the cyanhydrin with acetic anhydride (and this is probably the most convenient method), half the acetic anhydride consumed is reconverted into acetic acid, and only the remaining half actually enters into the cyanhydrin acetate. This means that, even assuming 100% yields throughout the whole series of reactions, for every 100 parts by weight of acrylonitrile produced it is necessary to convert no less than 220 parts of acetic acid into acetic anhydride, half of which is merely reconverted into acetic acid in the acetylation. In actual practice 100% yields are not obtained, and therefore even more acetic acid has to be converted into the anhydride.

The present invention provides a new process for the pyrolytic decomposition of esters of lower fatty acids to give unsaturated compounds as described above which has two important advantages. The first is that very good yields of the unsaturated compounds are obtained and side reactions occur to a very small extent if at all. The second is that the new process for the decomposition of the ester can easily be combined with a process for its formation in such a way that the two reactions proceed simultaneously and, from the practical point of view, in a single operation; and that in this single operation a quantity of acid anhydride may be employed which is less than that theoretically needed to esterify the whole of the hydroxy compound, or the esterification may be effected by means of the appropriate acid instead of the anhydride.

The invention consists in carrying out the pyrolytic decomposition of the ester in the vapour phase in the presence of free lower fatty acid additional to that produced from the ester undergoing decomposition. Preferably the additional lower fatty acid is identical with the esterifying acid, and both may with advantage be acetic acid.

The invention may be carried into effect by vaporising a mixture containing the ester and a free lower fatty acid, heating the vapours so produced to a temperature at which the ester gives rise to the unsaturated compound and free lower fatty acid, separating part or all of the free lower fatty acid or acids from the unsaturated compound and returning the separated free lower fatty acid or acids to the mixture of the ester and free lower fatty acid which is being vaporised.

In the preferred method of using the invention the hydroxy compound is esterified and the ester pyrolytically decomposed in a single operation. Advantageously, the hydroxy compound is heated with a lower fatty acid anhydride and/or a lower fatty acid until a part or all of the hydroxy compound has been esterified, ester so formed is vaporised together with free lower fatty acid, the vapour mixture containing the ester and free lower fatty acid is heated to a temperature at which the ester gives rise to the unsaturated compound and free lower fatty acid, part or all of the free lower fatty acid is separated from the unsaturated compound, and the separated free lower fatty acid is returned to the starting mixture.

A particularly valuable application of the invention is to the manufacture of acrylonitrile from ethylene cyanhydrin acetate or acetaldehyde cyanhydrin acetate, or in a single operation from the cyanhydrins themselves, and the invention will be described in detail with particular reference to these reactions. It is however also useful in the manufacture of other unsaturated compounds, and especially other compounds containing a polar group such for instance as the nitrile group, the carboxyl group, or an esterified carboxyl group, e. g. the group —COOCH$_3$, from hydroxy compounds of the formula

$$R_1R_2C(OH)CHR_3R_4$$

(where $R_1$, $R_2$, $R_3$, $R_4$ are the same or different atoms or carbon-containing groups). Thus crotonic nitrile may be made from propionaldehyde cyanhydrin acetate, beta-acetoxy-butyric nitrile or the corresponding unesterified hydroxy compounds; methacrylic nitrile may be made from acetone cyanhydrin acetate, beta-acetoxy-isobutyric nitrile or the corresponding unesterified hydroxy compounds; and methyl acrylate may be made from methyl alpha-acetoxy-propionate or from methyl lactate. Instead of acetic acid another lower fatty acid, e. g. propionic acid, may be used both as the esterifying acid and as the free acid, especially when the unsaturated compound to be made contains at least four carbon atoms.

When converting ethylene cyanhydrin or acetaldehyde cyanhydrin into acrylonitrile in a single operation as described above, especially when using glass or glass-lined apparatus, it is not necessary to employ sufficient acetic anhydride to acetylate the whole of the cyanhydrin. For example, the initial mixture may contain between 1 and 1.5 molecular proportions of acetic anhydride for every 2 molecular proportions of the cyanhydrin, with or without some acetic acid. As the acetylation of the cyanhydrin by the acetic anhydride proceeds, acetic acid is set free in the acetylation mixture, and the concentration of acetic acid in the acetylation mixture is further increased by the return to the acetylation mixture of acetic acid set free in the pyrolysis, and also by the removal of the cyanhydrin from the system in the form of acrylonitrile. When acetic acid is employed in the initial acetylation mixture in place of acetic anhydride, it is sufficient to employ initially about 1 molecular proportion of acetic acid for every molecular proportion of the cyanhydrin; in this case also as the pyrolysis proceeds the concentration of acetic acid in the mixture increases.

The pyrolysis of the cyanhydrin acetate may be effected in the presence or absence of a catalyst. When no catalyst is present a temperature between about 500° and 600° C. may be used, temperatures between about 530° and 580° C. being particularly useful. By employing a suitable catalyst the temperature necessary in any particular instance can be substantially reduced; for example in contact with silica gel, aluminium metaphosphate, or metaphosphoric acid, good yields of acrylonitrile are obtained at lower temperatures, e. g. at 400°–450° C. Catalysts such as aluminium metaphosphate or metaphorphoric acid may be deposited on a suitable carrier, for example charcoal or pumice.

One form of apparatus which is suitable for making acrylonitrile comprises a still-base with a vapour outlet to a fairly long vertical pyrolysis tube, which may for example be electrically heated, situated above the still-base; the upper end of the pyrolysis tube feeds into a fractionating column. The lower end of the fractionating column feeds back to the still-base, and the upper end is connected to a condenser and receiver. If desired the fractionating column may be provided with a dephlegmator. The pyrolysis tube may be empty, or it may be packed with a contact material which is substantially inert towards the pyrolysis, e. g. with glass beads or the like, or with a substance capable of acting as a catalyst towards the pyrolysis, e. g. silica gel or aluminium metaphosphate on a suitable carrier. Preferably the apparatus, especially the still-base and pyrolysis tube, is made of or lined with glass, but unlined metal apparatus may also be used, especially copper. If iron apparatus is employed it is important that the interior should be kept free from rust. The use of copper or other metal apparatus in the single stage process has the disadvantage that, unless the full theoretical amount of acetic anhydride is used, the yield of acrylonitrile is considerably reduced, and resinous products are formed in the still base.

In carrying out the process in apparatus of this kind a mixture of the cyanhydrin acetate and acetic acid, or the cyanhydrin itself and acetic anhydride and/or acetic acid, in the proportions already set out is boiled in the still-base; in the single stage process it is preferable at the beginning of the process, for example for between 30 minutes and 2 hours, to keep the mixture only just boiling, and to keep the pyrolysis tube cool so that it plays the part of a reflux condenser and continuously condenses the vapours leaving the still-base. When the decomposition of the ester is to begin the pyrolysis tube is heated to a suitable temperature, depending on whether or not a catalyst is present. At this stage in the process the vapour mixture entering the pyrolysis tube contains acetic acid, water, and the cyanhydrin acetate, and in the pyrolysis tube this last compound is very largely or almost entirely broken down into acrylonitrile and further acetic acid. Thus the vapour mixture passing from the pyrolysis tube to the fractionating column contains acetic acid, water, acrylonitrile, and any of the cyanhydrin acetate that may have escaped decomposition. The temperature in the fractionating column is adjusted so that the water and the acrylonitrile remain uncondensed and pass over to the condenser and receiver, usually with some acetic acid; the rest of the acetic acid and any unchanged cyanhydrin acetate are condensed in the fractionating column and returned to the still-base. As the reaction proceeds the temperature in the fractionating column may be allowed to rise to some extent, so that as the quantity of the cyanhydrin and/or its acetate in the still-base decreases, an increasing proportion of the acetic acid issuing from the pyrolysis zone is removed from the system with the acrylonitrile. Advantageously at any stage in the process the amount of acetic acid returned to the still-base may be between 3 and 5 times the weight of the cyanhydrin acetate entering the pyrolysis zone in the same period.

The distillate obtained as the product of the above process comprises acrylonitrile, water and acetic acid. In one method of isolating the acrylonitrile the distillate is subjected to fractional distillation; the first fraction, coming over at temperatures around 71° C., is an azeotropic mixture of water and acrylonitrile, which separates into two layers; the lower layer is a solution of acrylonitrile in water, and the acrylonitrile is obtained therefrom by salting out; the upper layer consists of acrylonitrile with a small proportion of water, and is dried, after which the acrylonitrile from the lower layer is added to the dried upper layer and the whole again fractionally distilled.

The apparatus described above may be modified so as to permit the reaction to be performed as a continuous process, by the addition of means whereby fresh ethylene or acetaldehyde cyanhydrin acetate and acetic acid, or fresh ethylene or acetaldehyde cyanhydrin and acetic anhydride and/or acetic acid, may be introduced into the still-base, either continuously or at suitable intervals, as the reaction proceeds. The amount of acetic anhydride or acetic acid so added will of course depend on the quantity of acetic acid leaving the system with the acrylonitrile, and if desired this acetic acid, after being separated by fractional distillation from the aqueous acrylonitrile as already described, may be returned to the still-base with the fresh cyanhydrin and as much fresh acetic anhydride or acid as is required to compensate for losses. It is not necessary that acetic acid so added should be anhydrous, although especially in the single stage process it is preferable to introduce as little water as is convenient, as until such water has been removed from the still-base by distillation, so increasing the consumption of heat at this point in the system, it acts to shift the equilibrium in the acetylation reaction and to decrease the proportion of the cyanhydrin acetate to unacetylated cyanhydrin in the mixture in the still-base.

The acetic acid or other lower fatty acid with which the cyanhydrin or cyanhydrin ester is heated in the process of the invention appears to have several different effects. Thus the ethylene and acetaldehyde cyanhydrin acetates can be vapourised in the presence of acetic acid at temperatures far below their normal boiling points, and in the pyrolysis zone the action of acetic acid in reducing the partial pressure of the cyanhydrin acetates is probably a factor to which is due the absence or small extent of side reactions even at the high temperatures employed for the pyrolysis.

The acetic acid also acts as an acetylating agent when the cyanhydrin itself is used as the starting material with less than the equivalent quantity of acetic anhydride, or in the absence of acetic anhydride. Moreover, the presence of a considerable proportion of acetic acid in the mixture in the still-base greatly assists in the removal therefrom of water which is set free in the acetylation when less than the equivalent amount of acetic anhydride or no acetic anhydride but only acetic acid is used, and so promotes the acetylation.

The following examples illustrate the invention. In each example the reaction was carried out in apparatus comprising a still-base, an electrically heated vertical pyrolysis tube, a fractionating column packed with glass beads, and a condenser and receiver, as already described.

*Example I*

The reaction was carried out in a copper apparatus, and the pyrolysis tube was heated to 520°–550° C. Ethylene cyanhydrin acetate was boiled in the still-base, and the fractionating column was air-cooled. When the reaction had been proceeding for a short time, about four parts by weight of acetic acid were being returned to the still-base for each part of the cyanhydrin acetate decomposed. Although the normal boiling point of ethylene cyanhydrin acetate is about 211° C., as soon as substantial quantities of acetic acid were being returned to the still base, the temperature therein became constant at about 165° C. Under these conditions it was found possible to obtain a 96% conversion of ethylene cyanhydrin acetate to acrylonitrile. The reaction can be carried out in a similar way starting with acetaldehyde cyanhydrin instead of ethylene cyanhydrin.

*Example II*

The reaction was carried out in glass apparatus. 400 parts by weight of ethylene cyanhydrin were heated to about 165° C. with 320 parts of 97% acetic anhydride in the still-base. For one hour the pyrolysis tube was unheated, and acted as a reflux condenser for the vapours leaving the still-base. At the end of this time the pyrolysis tube was heated to 500° C. and the reaction proceeded in the manner already described, the greater part of the acetic acid vapours (amounting to about four times the weight of the cyanhydrin acetate entering the pyrolysis tube) being condensed and returned to the still-base, and the acrylonitrile formed being collected together with the water and a little acetic acid. This mixture of products was fractionated, and the aqueous acrylonitrile fraction allowed to separate into two layers; the top layer was dried, the acrylonitrile contained in the bottom layer was salted out, and the whole of the acrylonitrile was again fractionated. The yield of acrylonitrile on the cyanhydrin was 90%.

*Example III*

The process of Example II was repeated, except that in place of the acetic anhydride 340 parts of acetic acid were employed, with a trace of concentrated sulphuric acid to promote the acetylation of the cyanhydrin. The yield of acrylonitrile was about 81%.

*Example IV*

The reaction was carried out in copper apparatus. 1000 parts of ethylene cyanhydrin and 1440 parts of acetic anhydride were mixed and fed dropwise into the still base, which was heated to 160°–170° C. The pyrolysis tube was heated to 530°–550° C. On fractionation of the product a yield of 86% of acrylonitrile was obtained.

In any of Examples II to IV the ethylene cyanhydrin can be replaced by the same quantity of acetaldehyde cyanhydrin.

Having described our invention, what we desire to secure by Letters Patent is:

1. A process for the production of alpha-beta unsaturated acids and their nitriles and esters, which comprises heating to boiling a mixture containing a lower fatty acid ester of a compound of formula $R_1R_2C(OH).CHR_3R_4$, where $R_1$, $R_2$ and $R_3$ are members of the group consisting of hydrogen atoms and lower alkyl radicals and $R_4$ is a member of the group consisting of the nitrile, carboxyl and esterified carboxyl radicles, and a free lower fatty acid, heating the vapor mixture so produced to a temperature at which the said ester decomposes into its lower fatty acid component and a compound of formula $R_1R_2C:CR_3R_4$, where $R_1$, $R_2$, $R_3$ and $R_4$ have the meanings set out above, separating from the vapor mixture so obtained at least a substantial part of its content of free lower fatty acid, and returning the separated free lower fatty acid to the boiling mixture.

2. A process for the production of alpha-beta unsaturated acids and their nitriles and esters, which comprises heating under reflux conditions 2 molecular proportions of a compound of formula $R_1R_2C(OH).CHR_3R_4$, where $R_1$, $R_2$ and $R_3$ are members of the group consisting of hydrogen atoms and lower alkyl radicles and $R_4$ is a member of the group consisting of the nitrile, carboxyl and esterified carboxyl radicles, with 1 to 1.5 molecular proportions of acetic anhydride whereby a mixture containing acetic acid and the acetate of the compound $R_1R_2C(OH).CHR_3R_4$ is formed, boiling the said mixture and heating the vapor mixture so produced to a temperature at which the said acetate decomposes into acetic acid and a compound of formula $R_1R_2C:CR_3R_4$, where $R_1$, $R_2$, $R_3$ and $R_4$ have the meanings set out above, separating from the vapor mixture so obtained a substantial part of its content of acetic acid, and returning the separated acetic acid to the boiling mixture.

3. Process according to claim 2, wherein the mixture of a compound of formula $$R_1R_2C(OH).CHR_3R_4$$

and acetic anhydride is heated to gentle boiling under reflux for ½ to 2 hours.

4. A process for the production of alpha-beta unsaturated acids and their nitriles and esters, which comprises heating under reflux conditions a compound of formula $R_1R_2C(OH).CHR_3R_4$ where $R_1$, $R_2$ and $R_3$ are members of the group consisting of hydrogen atoms and lower alkyl radicles and $R_4$ is a member of the group consisting of the nitrile, carboxyl and esterified carboxyl radicles, with at least an equimolecular proportion of acetic acid and a small proportion of an esterification catalyst, whereby a mixture containing acetic acid and the acetate of the compound of formula $R_1R_2C(OH).CHR_3R_4$ is formed, boiling the said mixture and heating the vapor mixture so produced to a temperature at which the said acetate decomposes into acetic acid and a compound of formula $R_1R_2C:CR_3R_4$, where $R_1$, $R_2$, $R_3$ and $R_4$ have the meanings set out above, separating from the vapor mixture so obtained a substantial part of its content of acetic acid, and returning the separated acetic acid to the boiling mixture.

5. Process according to claim 4, wherein the mixture of a compound of formula $$R_1R_2C(OH).CHR_3R_4$$

and acetic acid is heated to gentle boiling under reflux for ½ to 2 hours.

6. A process for the production of alpha-beta unsaturated aliphatic nitriles containing at most 4 carbon atoms, which comprises heating to boiling a mixture containing acetic acid and the acetate of a cyanhydrin containing at most 4 carbon atoms, heating the vapor mixture so obtained to a temperature of 400° to 600° C., and separating from the resulting composition and returning to the boiling mixture acetic acid in amount 3 to 5 times the weight of the cyanhydrin acetate leaving the boiling mixture in the same time.

7. A process for the production of acrylonitrile, which comprises heating to boiling under reflux conditions for ½ to 2 hours 2 molecular proportions of ethylene cyanhydrin with 1 to 1½ molecular proportions of acetic anhydride, whereby a mixture containing acetic acid and ethylene cyanhydrin acetate is produced, boiling the said mixture and heating the vapor mixture so obtained to a temperature of 500° to 600° C., and separating from the resulting composition and returning to the boiling mixture acetic acid in amount 3 to 5 times the weight of the cyanhydrin acetate leaving the boiling mixture in the same time.

8. A process for the production of acrylonitrile, which comprises heating to boiling under reflux conditions for ½ to 2 hours equimolecular proportions of ethylene cyanhydrin and acetic acid with a small proportion of an esterification catalyst, whereby a mixture containing acetic acid and ethylene cyanhydrin acetate is produced, boiling the said mixture and heating the vapor mixture so obtained to a temperature of 500° to 600° C., and separating from the resulting composition and returning to the boiling mixture acetic acid in amount 3 to 5 times the weight of the cyanhydrin acetate leaving the boiling mixture in the same time.

9. Process according to claim 6, wherein the vapor mixture is heated to 400° to 450° C. in the presence of a dehydrating catalyst.

10. A process for the production of a lower aliphatic ester of acrylic acid, which comprises heating to boiling under reflux conditions for ½ to 2 hours 2 molecular proportions of a lower aliphatic ester of a hydroxy-propionic acid with 1½ molecular proportions of acetic anhydride, whereby a mixture containing acetic acid and the acetate of the hydroxy-propionic ester is produced, boiling the said mixture and heating the vapor mixture so obtained to a temperature of 400° to 600° C., and separating from the resulting composition and returning to the boiling mixture acetic acid in amount 3 to 5 times the weight of the acetate of the hydroxy-propionic ester leaving the boiling mixture in the same time.

11. A process for the production of a methyl derivative of acrylonitrile, which comprises heating to boiling under reflux conditions for ½ to 2 hours 2 molecular proportions of a cyanhydrin containing 4 carbon atoms with 1 to 1½ molecular proportions of acetic anhydride, whereby a mixture containing acetic acid and the acetate of of the cyanhydrin is produced, boiling the said mixture and heating the vapor mixture so obtained to a temperature of 500° to 600° C., and separating from the resulting composition and returning to the boiling mixture acetic acid in amount 3 to 5 times the weight of the cyanhydrin acetate leaving the boiling mixture in the same time.

SAMUEL AARON MILLER.
WALTER HENRY GROOMBRIDGE.

REFERENCES CITED

The following references are of record in the file of this patent:

UNITED STATES PATENTS

| Number | Name | Date |
|---|---|---|
| 2,183,357 | Ritchie et al. | Dec. 12, 1939 |
| 2,356,247 | Kirk et al. | Aug. 22, 1944 |